United States Patent
Mayerjak

Patent Number: 5,851,150
Date of Patent: Dec. 22, 1998

[54] FLEXIBLE COUPLING WITH RECTANGULAR FLEX FRAME AND UNIFORM STIFFNESS

[75] Inventor: Robert J. Mayerjak, Torrington, Conn.

[73] Assignee: Kamatics Corporation, Bloomfield, Conn.

[21] Appl. No.: 30,806

[22] Filed: Mar. 12, 1993

[51] Int. Cl.[6] ................................................ F16D 3/62
[52] U.S. Cl. ................................................ 464/69; 464/147
[58] Field of Search .................... 464/69, 81, 84, 464/98, 99, 100, 147

[56] References Cited

U.S. PATENT DOCUMENTS

| | | | |
|---|---|---|---|
| 3,177,684 | 4/1965 | Bossler | 464/60 |
| 3,481,158 | 12/1969 | Mayerjak | 464/69 |
| 3,521,465 | 7/1970 | Bossler | 464/69 |
| 3,592,021 | 7/1971 | Mayerjak | 464/69 |
| 4,385,895 | 5/1983 | Wirth | 464/69 |
| 4,392,837 | 7/1983 | Wirth | 464/69 |
| 4,615,687 | 10/1986 | Wirth | 464/69 |

Primary Examiner—Eileen Dunn Lillis
Attorney, Agent, or Firm—McCormick, Paulding & Huber

[57] ABSTRACT

A flexible coupling comprised of one or more flex frames connected in series between end fittings has the legs of its flex frames so dimensioned as to provide the coupling with a uniform bending stiffness with respect to bending moments in planes at all angles to the rotational axis. This is achieved by having each flex frame itself be of uniform bending stiffness with the other coupling components designed so as to have substantially no influence on the coupling's bending characteristics, or by using in the coupling at least one "compensator" flex frame specifically dimensioned to have a non-uniform bending stiffness compensating the non-uniform bending stiffnesses of the other coupling components.

20 Claims, 4 Drawing Sheets

FLEXIBLE COUPLING WITH RECTANGULAR FLEX FRAME AND UNIFORM STIFFNESS

FIELD OF THE INVENTION

This invention relates to flexible couplings used to connect and transmit rotary power between substantially aligned driving and driven shafts or similar rotary members and to accommodate slight angular misalignments which may occur between the two shafts, which couplings are made up of one or more rectangular flex frames each providing two pairs of parallel legs, and deals more particularly with an improvement in such couplings aimed at reducing or eliminating cyclic excitations heretofore often produced by such couplings during operation and that sometimes can cause undesirable, or even prohibitive shaking vibrations, in adverse applications.

BACKGROUND OF THE INVENTION

Couplings to which this invention pertain are of the general type disclosed in Bossler U.S. Pat. No. 3,177,684 wherein a complete coupling consists of a number of straight line elements or legs connected to one another and to the driving and driven shafts so as to roughly define two helices of opposite hand extending from the driving shaft to the driven shaft with the coupling accommodating angular misalignment of the two shafts solely by bending and torsion of the individual straight legs.

U.S. Pat. No. 3,481,158 to Mayerjak, U.S. Pat. No. 3,592,021 to Mayerjak, U.S. Pat. No. 4,385,895 to Wirth, U.S. Pat. No. 4,392,837 to Wirth, and U.S. Pat. No. 4,615,687 to Wirth all disclose further developments of the Bossler coupling wherein the straight legs of the coupling are provided by one or more flexure members, referred to herein as flex frames because of their frame-like shape, each providing four of the coupling's straight legs. In cases where the coupling is made up of two or more flex frames the frames are preferably of rectangular shape with two parallel short legs and two parallel long legs as shown, for example, by FIG. 1 of U.S. Pat. No. 3,592,021. This causes the bolts connecting the flex frames to one another to be rotationally staggered about the rotational axis of the coupling thereby permitting the frames to be made as relatively flat members to minimize the length of the coupling and the spacing required for insertion of the coupling between the driving and driven shafts. An important use of these couplings is in helicopters for connecting shafts in the power transmitting train between the engine and the lifting rotor where the coupling's long service life, no need for lubrication, and capability of being designed to occupy a small space, using rectangular flex frames, is of particular advantage.

In the past, when using couplings with rectangular flex frames they have in operation sometimes generated cyclic exciting forces causing shaking or vibration of associated structures which, under adverse conditions, such as operation at certain rotational speeds or high amounts of misalignment between the driving and driven shafts, may become undesirable or even prohibitive.

The object of the invention is accordingly to provide an improvement in the construction of the involved type of coupling to substantially reduce or eliminate the above-mentioned cyclic excitations during operation, to reduce the vibrations resulting from such excitations and to thereby expand the usefulness of the couplings by permitting them to be used under some conditions or in some applications previously considered unacceptable.

SUMMARY OF THE INVENTION

The solution to the above stated object of the invention resides in the discovery that the appearance of cyclic excitational forces during the operation of couplings with one or more rectangular flex frames is a result of the couplings having a non-uniform flexural stiffness with respect to the bending moments applied between their ends during operation with angularly misaligned shafts, such moments being ones occurring in planes containing the coupling's rotational axis, with the non-uniform flexural stiffness of a coupling being due in turn to the non-uniform flexural stiffness of its rectangular flex frames and their non-symmetric arrangement about the coupling's rotational axis.

The invention further resides in a coupling of the foregoing character being constructed of one or more rectangular flex frames specifically designed with regard to its or their flexural stiffness so that the coupling overall, in comparison to prior couplings with rectangular flex frames has a more nearly uniform bending stiffness between its two ends. As used here the term "uniform bending stiffness" means that if one end of the coupling is fixed and the other end is bent by a moment vector perpendicular to the rotational axis the stiffness encountered by the moment vector will be the same at all angles the moment vector may take about the rotational axis.

The invention also resides in obtaining the desired more nearly uniform stiffness of the coupling by either having all of its individual rectangular flex frames be ones of uniform, or nearly uniform, stiffness or by having one or more of its flex frames be of such non-uniform stiffness as to compensate the non-uniform stiffness of the other flex frames and yield a more nearly uniform stiffness for the overall coupling.

The invention still further resides in my preferred and best known way of designing the flex frame or frames of a coupling to have the uniform or compensating stiffness characteristics yielding the desired more nearly uniform stiffness of the coupling, as described in detail hereinafter.

EXPLANATION OF NOTATIONS

Figure 1:
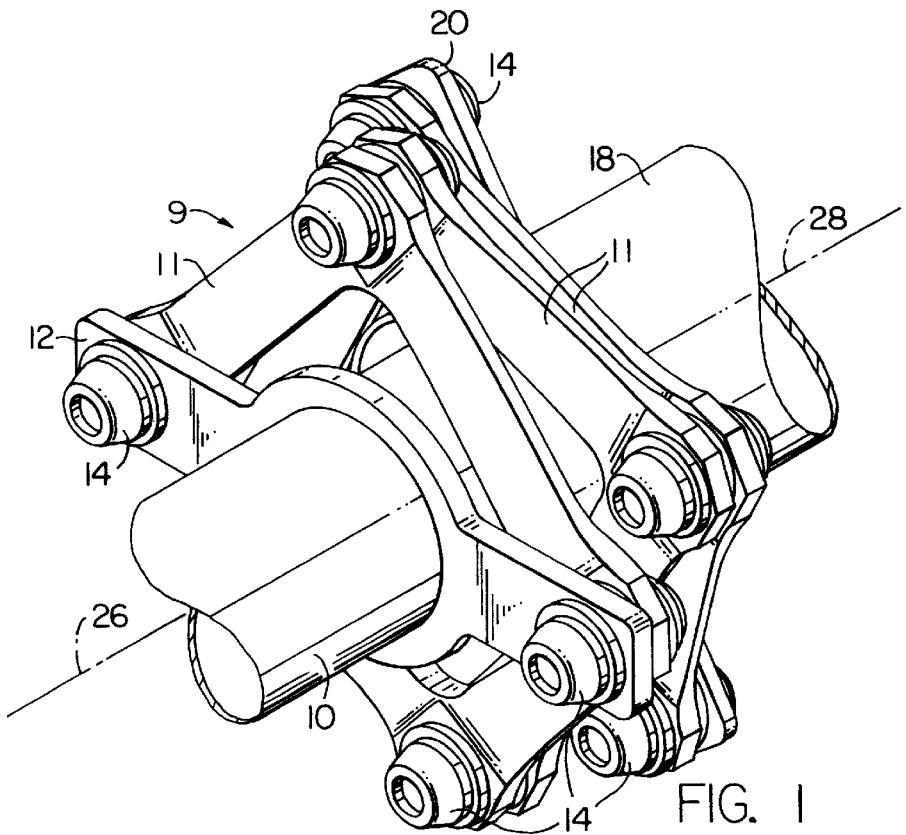
FIG. 1 is a perspective view of a flexible coupling embodying the invention, and showing the coupling connected to a driving shaft and to a driven shaft, which shafts may be out of angular alignment with one another.

In the drawings and in the description of the preferred embodiment which follows the following notation, familiar to those skilled in the art of structural analysis, is used:

1. A symbol representing a vector is indicated as such by drawing a short bar over it, while the same symbol without the bar is understood to be the magnitude of the vector, e.g.:

$\bar{a}$ = a vector a = the magnitude of the vector.

2. A vector is shown in a figure as a line with an arrow head that identifies the direction of positive sense. A single arrow head is used for quantities such as position, displacement, velocity, acceleration, force and small angles.

3. When linear quantities (e.g. position, displacement, etc.) are shown, the tail of the arrow indicates the start and the point of the arrow the end. When angular quantities (e.g. small angles, angular velocities, moments etc.) are shown, another convention is required. The direction and sense of the angle or rotation is understood to be defined as the direction that the fingers point when the arrow is grasped by an imaginary hand with the thumb pointing in the direction of the arrow. The convention allows the reader to use either a right hand or a left hand, but the same hand must be used consistently.

4. A vector representing a moment is shown with double arrow heads to call special attention to its status as a moment.

DETAILED DESCRIPTION OF THE PREFERRED EMBODIMENT

Figure 2:
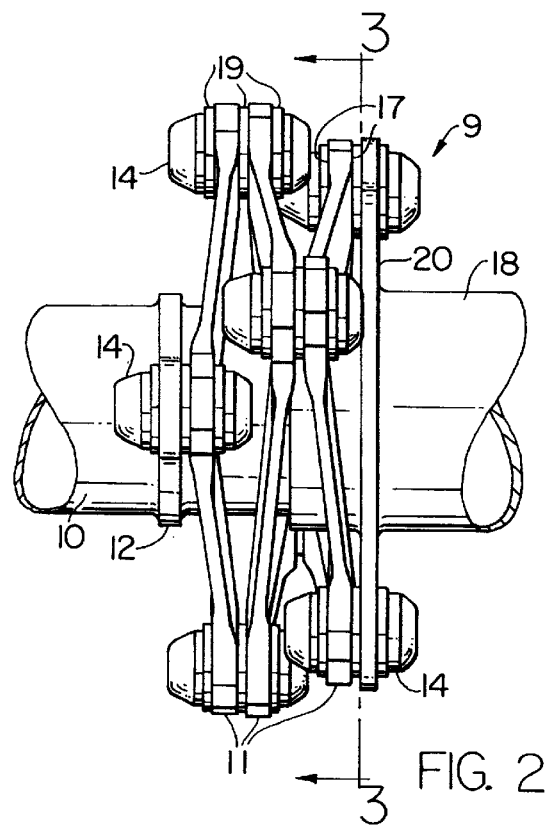
FIG. 2 is an elevational view of the coupling of FIG. 1.
Figure 3:
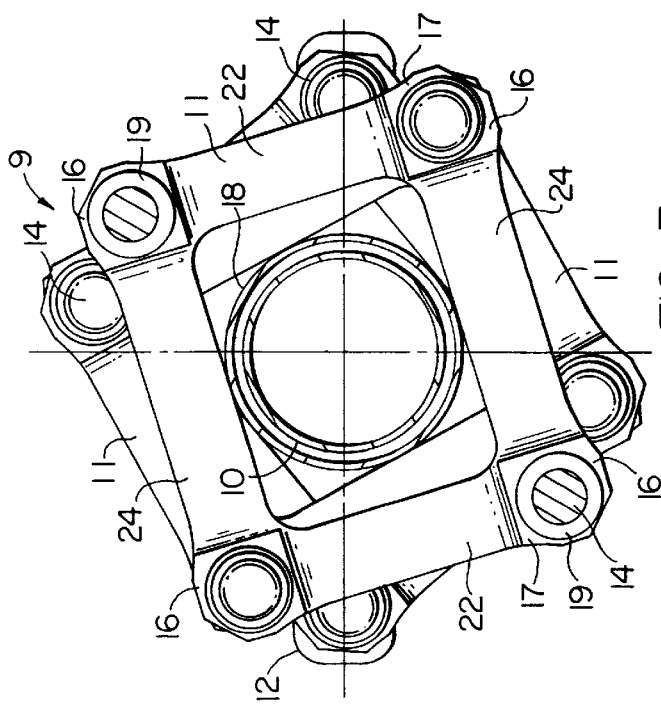
FIG. 3 is a sectional view taken along the line 3—3 of FIG. 2.

A coupling embodying the invention may be made up of a single rectangular flex frame connected between the driving and driven shafts; however, it is believed that in most constructions such couplings will include two or more rectangular flex frames connected in series with one another between the driving and driven shafts. By way of example FIGS. 1, 2 and 3 show a flexible coupling, indicated generally at 9, embodying the invention and having three rectangular flex frames 11. Except for its flex frames being shaped and dimensioned so as to have specific flexural stiffness characteristics in accordance with this invention, and using washers in association with its flex frames as taught by U.S. Pat. No. 4,385,895, the coupling 9 is or may be basically the same as that shown by FIGS. 1, 2 and 3 of U.S. Pat. No. 3,481,158, to which reference is made for further details.

For the present purposes it is sufficient to note that the coupling 9 has a first connecting means in the form of a first rigid end fitting 12 for fixed connection to a driving shaft 10 and a second connecting means in the form of a second rigid end fitting 20 for fixed connection to a driven shaft 18. Between the two end fittings 12 and 20 the three flex frames 11 are connected, as taught by the above-mentioned patents, at their corners to one another in series and to the two end fittings 12 and 20 by suitable fasteners such as the illustrated bolts 14. As seen in FIG. 3 each flex frame 11 is of substantially rectangular shape having two parallel short legs 22 and two parallel long legs 24, with one short leg and one long leg joining each other at each of four corners of the frame. Each corner is defined by a pad or corner portion 16 having a uniform thickness and two parallel oppositely directed pad faces 17, and washers 19 with concentric circular inner and outer edges are received on the fastening bolts 14 so that each pad face 17 is engaged by a washer 19 in the region of the associated bolt.

The driving shaft 10 is rotatable about an axis 26 and the driven shaft about an axis 28. These axes are intended to be aligned as closely as possible with one another, with the coupling 11 serving to accommodate whatever slight amount of angular misalignment may nevertheless occur between them. For purposes of this discussion the axis 26 of the driving shaft 10 is taken as the reference axis and the axis 28 of the driven shaft is taken as the variable axis which may be either exactly aligned with the reference axis 26 or angularly misaligned by being inclined at some small angle to the axis 26. The rotational axis of the coupling 9 is taken to be aligned with the rotational axis 26 of the driving shaft 10. Therefore, the end fitting 12 fixed to the driving shaft 10 is the reference end of the coupling and any angular misalignment which exists between the axes 26 and 28 is accompanied by bending of the coupling to displace the center of the other end fitting 14, connected to the driven shaft 18, slightly away from the axis 26.

When angular misalignment exists between the driving and driven shafts the two shaft axes 26 and 28 lie in a common plane fixed relative to the structure supporting the two shafts. Therefore as the shafts and coupling rotate through one revolution the non-reference end of the coupling is progressively deflected in all directions away from the reference axis 26, and likewise each flex frame 11 has applied to it a bending moment located in the plane containing the axes 26 and 28, which moment plane rotates relative to the flex frame in unison with the rotation of the coupling.

In prior couplings with flex frames of rectangular shape the four legs of each frame have either been basically of the same thickness, or the two long legs have been thinner than the two short legs in keeping with U.S. Pat. No. 4,392,837, causing the flex frame to have a non-uniform flexural stiffness with respect to the bending moment applied to them during operation of the coupling with a pair of angularly misaligned shafts. That is, as the input shaft was rotated the stiffness exhibited by a flex frame to the deflection imposed on it varied with the rotational angle of the coupling. Typically, the ratio of maximum to minimum stiffness of a flex frame was about 2.0 and the ratio of maximum to minimum stiffness for the entire coupling was about 1.23 causing the coupling to produce cyclic excitations, under conditions of misaligned shafts, during continuous rotation of the driven shaft 10 through multiple revolutions. Also the stiffness of a coupling made of identical rectangular flex frames with long legs thinner than the short legs is basically more non-uniform than a similar coupling made of four identical flex frames with long and short legs of equal thickness.

In accordance with the invention the above-mentioned cyclic excitations generated during operation of a rectangular flex frame coupling are reduced or eliminated by using in the coupling one or more rectangular flex frames 11 having such stiffness in various bending planes passing through the coupling axis as to give the overall coupling a more nearly uniform stiffness when one of its ends is deflected relative to the other end in any direction away from the coupling's axis, in comparison to a similar coupling using identical flex frames with long and short legs of basically the same thickness. That is, in the case of the coupling 9 of FIGS. 1, 2 and 3 the stiffnesses of each individual flex frame 11 is such that if the driving end fitting 12 is fixed a given bending moment applied to the driven end fitting 20 will angularly deflect the axis 28 by the same, or nearly the same, amount regardless of the angular direction of the bending moment applied to the fitting 20; or conversely if the shaft axis 28 is angularly deflected in any direction away from the axis 26 by a fixed amount the same, or nearly the same, amount of bending moment will have to be applied to the end fitting to achieve such deflection.

In accordance with a more specific embodiment of the invention all of the rectangular flex frames included in a coupling are "iso-stiffness" ones, that is, ones which exhibit uniform, or very nearly uniform, stiffness throughout a complete revolution of the coupling when flexed by the angular misalignment occurring between the driving and driven shafts. Therefore, in the case of the coupling 9, when it is made in keeping with this specific embodiment, each of its three flex frames 11 have such uniform, or nearly uniform, stiffness and therefore provide the overall coupling 9 with a similar uniform, or nearly uniform, stiffness characteristic which reduces or eliminates the production of undesired cyclic excitations. In evaluating the stiffness uniformity of a flex frame or of an entire coupling it is practical to compare maximum stiffness to minimum stiffness using the ratio of max. stiffness/min. stiffness. As mentioned, in prior couplings this stiffness ratio is about 2.0 for a single flex frame and 1.23 for the entire coupling; and any significant lowering of this value achieved by practice of the present invention is of some worth. Preferably, however, the invention is used to reduce the ratio for a complete coupling to about 1.10 or less; and it is even more desirable if the ratio for a complete coupling is kept to 1.05 or less.

In another specific embodiment of the invention a coupling consists of rectangular flex frames of at least two different types having different non-uniform stiffnesses which so compensate one another, and also possibly a non-uniform stiffness of the end fittings, that the overall coupling has a uniform, or nearly uniform, stiffness when flexed in any direction. Therefore, when it is made in keeping with this specific embodiment, in the coupling 9, the two flex frames 11 connected respectively to the end fitting 12 and to the end fitting 20 may be of a type A and the third or middle flex frame 11 of a type B, with the type A and B frames having different non-uniform stiffnesses so related to each other, and also possibly to the non-uniform stiffnesses of the end fittings in the event those fittings are not very stiff, as to give the coupling a uniform, or nearly uniform, stiffness. In particular it has been found that if the middle or type B flex frame is made to have a moderately greater non-uniformity of stiffness (that is, ratio of max. stiffness/min. stiffness) than that of the two type A flex frames, the flexural stiffness of the overall coupling will be more nearly uniform than if made of three type A frames. The type B frame therefore can be taken to be a "compensator" frame that compensates for the stiffness non-uniformity of the other two frames.

Also, a coupling made in accordance with the embodiment described in the preceding paragraph may be one wherein the end fittings are sufficiently non-rigid as to have some significant influence on the bending characteristics of the coupling and to further be of non-uniform bending stiffnesses. Then, instead of the type A flex frames and the type B flex frames both being ones having non-uniform bending stiffnesses the coupling could alternatively be one wherein the type A flex frames, for example, are ones of uniform bending stiffness and the type B flex frame or frames one or ones having such non-uniform bending stiffness as to compensate for the non-uniform bending stiffness of the end fittings; that is, to provide the overall coupling with a bending stiffness more uniform than it would be if made with all type A flex frames of uniform stiffness or if made with all type B flex frames of non-uniform stiffness, the ratio of maximum bending stiffness to minimum bending stiffness for the overall coupling being no greater than about 1.10, and preferably being less than 1.05.

Still further, if the end fittings are ones sufficiently non-rigid as to have some significant influence on the bending characteristics of the coupling and to further be of non-uniform bending stiffnesses a coupling embodying the invention could be one having only a single rectangular flex frame, or a plurality of identical flex frames, with the frame or frames being of a "compensator" type so dimensioned as to have a non-uniform bending stiffness causing the bending stiffness of the coupling to be more uniform than it would be if its single flex frame or frames made in accordance with the prior art. That is, the single flex frame, or each of the plurality of identical frames, would be so dimensioned as to give the coupling a bending stiffness characteristic such that the ratio of maximum stiffness to minimum stiffness would be no greater than about 1.10, and preferably 1.05 or less.

EXAMPLES

Prior Art Coupling

For purposes of comparison, Table I below shows the stiffness characteristics of the individual flex frames and of the overall coupling for a conventional prior art coupling having three identical rectangular flex frames with long and short legs of basically the same thickness. As indicated the values given are measured ones obtained by applying moments to an actual flex frame or coupling and measuring the deflections produced by such moments.

TABLE I

Bending Stiffnesses for a Prior Art Coupling Having Three Rectangular Flex Frames of Identical Non-Uniform Stiffness

| | Bending Stiffness, in.-lb./° | | Ratio |
| --- | --- | --- | --- |
| | Max | Min | Max/Min |
| Indiv. flex frame (measured) | 800 | 421 | 1.90 |
| Complete coupling (measured) | 202 | 165 | 1.23 |

As shown by this table the involved coupling has a relatively non-uniform bending stiffness as given by its stiffness ratio of 1.23. In operation this coupling was found to produce unacceptable cyclic excitations under certain operating conditions.

EXAMPLE 1

A coupling was designed in accordance with the first described embodiment of the invention having three rectangular flex frames of uniform stiffness, and otherwise of a construction basically similar to that of Table I, including the same end fittings as the coupling of Table I. Table II below shows the stiffness characteristics of each flex frame and of the overall coupling. The values both for the individual flex frame and for the complete coupling are theoretical ones obtained using the analytical method described hereinafter.

TABLE II

Bending Stiffnesses for a Coupling Having Three Rectangular Flex Frames of Identical Uniform Stiffness

| | Bending Stiffness, in.-lb./° | | Ratio |
| --- | --- | --- | --- |
| | Max | Min | Max/Min |
| Indiv. flex frame (theoretical) | 1007 | 1007 | 1.00 |
| Complete coupling (theoretical) | 330 | 304 | 1.085 |

The coupling's stiffness ratio of 1.085 departs from the ideal value of 1.00 due to the end fittings used being of such relatively low and non-uniform stiffness as to slightly degrade the coupling's stiffness characteristics. The stiffness ratio could have been further improved, bringing it closer to 1.0, by making the end fittings more rigid.

Figure 5:
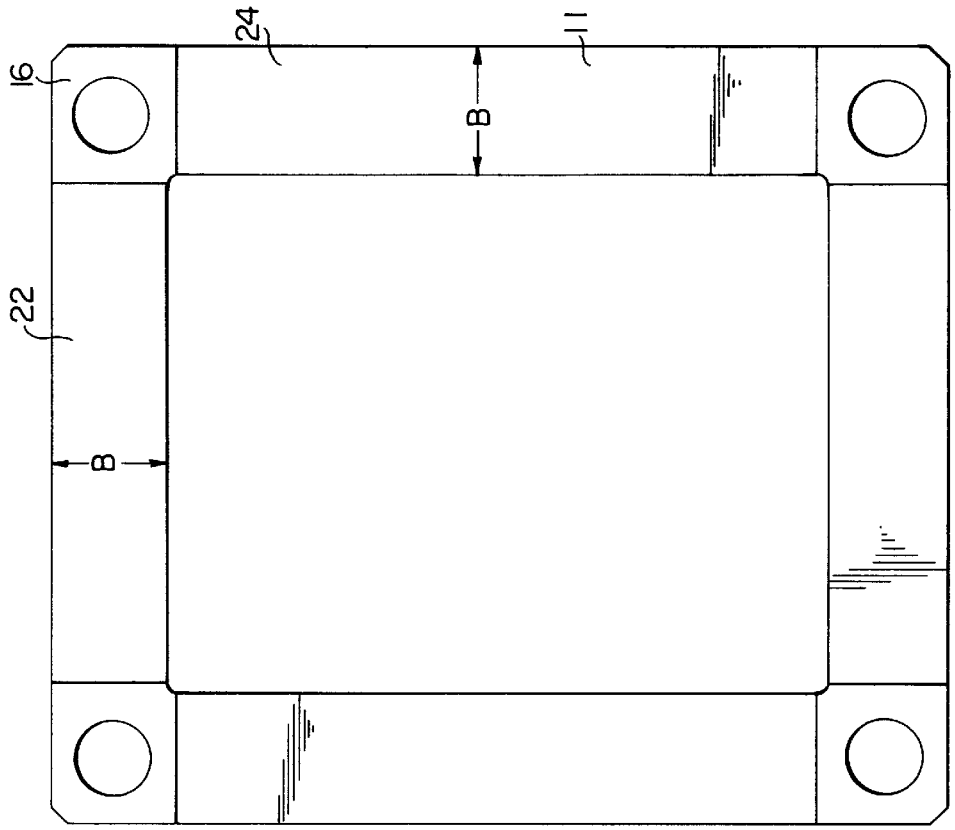
FIGS. 4 and 5 are respectively a side view and a plan view of one of the flex frames of the FIG. 1 coupling in which views the flex frame is idealized for the purpose of theoretically analyzing its flexural stiffness and other structural properties, the view also showing dimensional parameters of the flex frame taken into account in the theoretical analysis.
Figure 4:
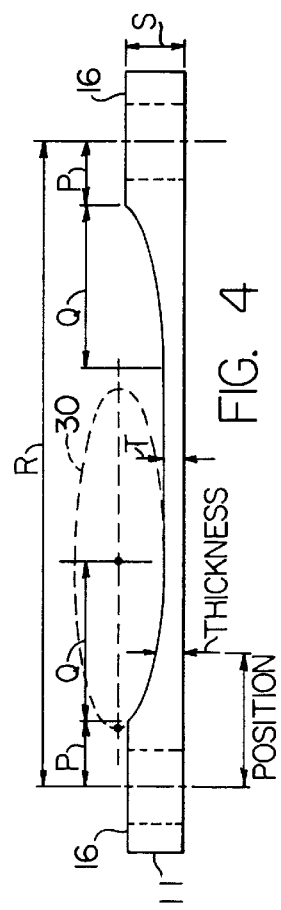

FIGS. 4 and 5 show a flex frame of idealized shape used in the structural analysis employed, as hereinafter described in more detail, to arrive at the dimensions of the flex frames used in the coupling of Table II, and also showing various dimensional parameters some or all of which may be selectively varied during the analysis to achieve the desired stiffness characteristic for the frames. With reference to these figures, the dimensions of each individual flex frame in the coupling of Table II was as follows:

Short Leg of Frame

| PAD LENGTH | P = .5 | LEG WIDTH | B = 1 |
| CONTOUR LENGTH | Q = 1.0 | ELLIPSE RATIO | K = 3.2 |
| C—C BOLT HOLES | R = 4.628 | YOUNG'S MODULUS | E = 30000 |
| PAD THICKNESS | S = .32 | | |
| MIDDLE PORTION LEG THICKNESS | T = .1285 | | |

| Station | Thickness | Position |
|---|---|---|
| 1 | 0.32000 | 0.0000 |
| 2 | 0.32000 | 0.5000 |
| 3 | 0.26968 | 0.6000 |
| 4 | 0.23324 | 0.7000 |
| 5 | 0.20508 | 0.8000 |
| 6 | 0.18283 | 0.9000 |
| 7 | 0.16523 | 1.0000 |
| 8 | 0.15153 | 1.1000 |
| 9 | 0.14126 | 1.2000 |
| 10 | 0.13411 | 1.3000 |
| 11 | 0.12989 | 1.4000 |
| 12 | 0.12850 | 1.5000 |

Long Leg of Frame

| PAD LENGTH | P = .77 | LEG WIDTH | B = .78 |
| CONTOUR LENGTH | Q = 1.75 | ELLIPSE RATIO | K = 1 |
| C—C BOLT HOLES | R = 5.516 | YOUNG'S MODULUS | E = 30000 |
| PAD THICKNESS | S = .32 | | |
| MIDDLE PORTION LEG THICKNESS | T = .2085 | | |

| Station | Thickness | Position |
|---|---|---|
| 1 | 0.32000 | 0.0000 |
| 2 | 0.32000 | 0.7700 |
| 3 | 0.29875 | 0.9450 |
| 4 | 0.27976 | 1.1200 |
| 5 | 0.26302 | 1.2950 |
| 6 | 0.24854 | 1.4700 |
| 7 | 0.23629 | 1.6450 |
| 8 | 0.22628 | 1.8200 |
| 9 | 0.21850 | 1.9950 |
| 10 | 0.21294 | 2.1700 |
| 11 | 0.20961 | 2.3450 |
| 12 | 0.20850 | 2.5200 |

The dimensions given are in inches. The parameter "C—C bolt holes" is the distance, R, between the centers of the bolt holes at the opposite ends of the given leg. The parameter "ellipse ratio" is the ratio of the major axis length to the minor axis length of the ellipse 30 chosen to define the contour of the contour portions Q of the involved leg. The parameter "position" defines the location of the associated station as measured from the center of the adjacent bolt hole. For example, in the short leg described above station 5 is located 0.8000 inches from the adjacent bolt hole center, and at that station the leg has a thickness of 0.20508 inch.

EXAMPLE 2

A coupling was made in accordance with the second described embodiment of the invention having two end flex frames of type A and a middle flex frame of type B, and was otherwise of a construction basically similar to that of Table I, including the same end fittings as the coupling of Table I. Table III below shows the stiffness characteristics of each flex frame and of the overall coupling. The values for the individual flex frames were obtained theoretically using the structural analysis hereinafter described in more detail. The values of the complete coupling were obtained both by using a theoretical structural analysis of the type hereinafter described and also by experimentally measuring the deflections caused by loads applied to an actual coupling.

TABLE III

| | Bending Stiffness, in.-lb./° | | Ratio |
|---|---|---|---|
| | Max | Min | Max/Min |
| Indiv. type A flex frame (theoretical) | 1004 | 674 | 1.49 |
| Indiv. type B flex frame (theoretical) | 964 | 497 | 1.94 |
| Complete coupling (theoretical) | 248 | 235 | 1.05 |
| Complete coupling (measured) | 254 | 247 | 1.03 |

Under actual operating conditions the coupling was found to produce cyclic excitations reduced from that of the coupling of Table I and to perform satisfactorily under conditions of operation not acceptably handled by the coupling of Table I. The close agreement, as shown by Table III, between the values obtained for the complete coupling through the theoretical analysis and through the experimental measurements demonstrate the validity of the theoretical analysis.

With reference to FIGS. 4 and 5, the dimensions of each individual flex frame in the coupling of Table III was as follows:

TYPE A FRAME

Short Leg of Frame

| PAD LENGTH | P = .48 | LEG WIDTH | B = .8 |
| CONTOUR LENGTH | Q = 1.5 | ELLIPSE RATIO | K = 4 |
| C-C BOLT HOLES | R = 4.628 | YOUNG'S MODULUS | E = 30000 |
| PAD THICKNESS | S = .32 | | |
| MIDDLE PORTION LEG THICKNESS | T = .1335 | | |

| Station | Thickness | Position |
|---|---|---|
| 1 | 0.32000 | 0.0000 |
| 2 | 0.32000 | 0.4800 |
| 3 | 0..27629 | 0.6300 |
| 4 | 0.24162 | 0.7800 |
| 5 | 0.21358 | 0.9300 |
| 6 | 0.19082 | 1.0800 |
| 7 | 0.17250 | 1.2300 |
| 8 | 0.15806 | 1.3800 |
| 9 | 0.14715 | 1.5300 |
| 10 | 0.13952 | 1.6800 |
| 11 | 0.13500 | 1.8300 |
| 12 | 0.13350 | 1.9800 |

Long Leg of Frame

| PAD LENGTH | P = .58 | LEG WIDTH | B = .78 |
| CONTOUR LENGTH | Q = 1.8 | ELLIPSE RATIO | K = 1 |

-continued

| | | | |
|---|---|---|---|
| C-C BOLT HOLES | R = 5.516 | YOUNG'S MODULUS | E = 30000 |
| PAD THICKNESS | S = .32 | | |
| MIDDLE PORTION LEG THICKNESS | T = .1665 | | |

| Station | Thickness | Position |
|---|---|---|
| 1 | 0.32000 | 0.0000 |
| 2 | 0.32000 | 0.5800 |
| 3 | 0.29006 | 0.7600 |
| 4 | 0.26448 | 0.9400 |
| 5 | 0.24144 | 1.1200 |
| 6 | 0.22150 | 1.3000 |
| 7 | 0.20467 | 1.4800 |
| 8 | 0.19091 | 1.6600 |
| 9 | 0.18022 | 1.8400 |
| 10 | 0.17260 | 2.0200 |
| 11 | 0.16802 | 2.2000 |
| 12 | 0.16650 | 2.3800 |

TYPE B FRAME

Short Leg of Frame

| | | | |
|---|---|---|---|
| PAD LENGTH | P = .48 | LEG WIDTH | B = .8 |
| CONTOUR LENGTH | Q = 1.5 | ELLIPSE RATIO | K = 4 |
| C-C BOLT HOLES | R = 4.628 | YOUNG'S MODULUS | E = 30000 |
| PAD THICKNESS | S = .32 | | |
| MIDDLE PORTION LEG THICKNESS | T = .1335 | | |

| Station | Thickness | Position |
|---|---|---|
| 1 | 0.32000 | 0.0000 |
| 2 | 0.32000 | 0.4800 |
| 3 | 0.27629 | 0.6300 |
| 4 | 0.24162 | 0.7800 |
| 5 | 0.21358 | 0.9300 |
| 6 | 0.19082 | 1.0800 |
| 7 | 0.17250 | 1.2300 |
| 8 | 0.15806 | 1.3800 |
| 9 | 0.14715 | 1.5300 |
| 10 | 0.13952 | 1.6800 |
| 11 | 0.13500 | 1.8300 |
| 12 | 0.13350 | 1.9800 |

Long Leg of Frame

| | | | |
|---|---|---|---|
| PAD LENGTH | P = .48 | LEG WIDTH | B = .78 |
| CONTOUR LENGTH | Q = 1.7 | ELLIPSE RATIO | K = 1 |
| C-C BOLT HOLES | R = 5.516 | YOUNG'S MODULUS | E = 30000 |
| PAD THICKNESS | S = .32 | | |
| MIDDLE PORTION LEG THICKNESS | T = .1485 | | |

| Station | Thickness | Position |
|---|---|---|
| 1 | 0.32000 | 0.0000 |
| 2 | 0.32000 | 0.4800 |
| 3 | 0.28714 | 0.6500 |
| 4 | 0.25786 | 0.8200 |
| 5 | 0.23210 | 0.9900 |
| 6 | 0.20984 | 1.1600 |
| 7 | 0.19105 | 1.3300 |
| 8 | 0.17571 | 1.5000 |
| 9 | 0.16379 | 1.6700 |
| 10 | 0.15529 | 1.8400 |
| 11 | 0.15020 | 2.0100 |
| 12 | 0.14850 | 2.1800 |

Again, the dimensions are in inches and the parameters are the same as those described in Example 1.

The invention as described above involves flexible couplings using rectangular flex frames having specific stiffness characteristics. The best way presently known to me for producing rectangular flex frames with the desired stiffness characteristics a basically trial and error one, as described below.

In the case of a coupling having essentially rigid end fittings and made up entirely of one or more identical flex frames of uniform stiffness, it is sufficient to deal with only one flex frame itself, since it is known that a coupling made with rigid end fittings and identical uniform stiffness flex frames will itself be of uniform stiffness. In this case a set of dimensions for a first trial flex frame is selected, and then the stiffness characteristics of a first trial flex frame made in accordance with such dimensions are determined. Assuming this first trial flex frame does not exhibit acceptable stiffness characteristics another set of dimensions for a second trial flex frame is selected, with the second set of dimensions being modified from those of the first set in ways which the investigator intuitively believes will cause the second trial flex frame to have stiffness characteristics more closely meeting the desired stiffness specifications than the first trial frame, and the stiffness characteristics of a second trial flex frame made in accordance with this second set of dimensions is then evaluated. This procedure of selecting a set of dimensions and evaluating the stiffness of a flex frame made in accordance with them is then repeated as often as necessary to finally arrive at a set of dimensions for producing a flex frame having the desired stiffness characteristics. Of course, in selecting dimensions for a flex frame consideration must also be given to other requirements to be met by the frame, such other requirements including sufficient stiffness to allow safe operation at non-critical speeds of the drive train assembly, sufficient strength and torsional stability to transmit the maximum operating power, sufficiently low stresses under maximum misalignment conditions of service as to yield a coupling lifetime of acceptable length, and, for some applications, a sufficiently low maximum stiffness assuring that the components connected to the opposite ends of the coupling are not overloaded. Therefore, before accepting a given set of dimensions for a flex frame an evaluation must be made to be certain that these other requirements are also met.

In the case of a coupling made up of a plurality of flex frames of at least two different types, one of which types is taken to be a "compensator" flex frame, the characteristics of all parts of the coupling, except for those of the compensator flex frame or frames, is pre-given. Then a set of dimensions for a first trial compensator flex frame is selected, and the stiffness characteristics of a coupling using a compensator flex frame or frames of such dimensions are determined. Assuming the first trial design of a compensator flex frame does not result in a coupling having the desired uniform stiffness characteristics another set of dimensions for a second trial compensator flex frame is selected and the stiffness characteristics of a coupling made using such trial compensator flex frame or frames is evaluated; and again this procedure is repeated until arriving at an acceptable set of dimensions for the compensator flex frame or frames also taking into the consideration the other requirements imposed on the flex frames of the coupling as above mentioned.

In the above-described trial and error processes for arriving at a rectangular flex frame having acceptable stiffness characteristics the step (in the first case) of evaluating the stiffness of a trial flex frame made in accordance with a set of proposed dimensions or (in the second case) of evaluating the stiffness of a coupling using a compensator flex frame or frames made in accordance with a set of proposed dimensions may be carried out by actually making a flex frame in accordance with the proposed set of dimensions and then (in the first case) testing that frame or (in the second case) testing a real coupling made up of such frame or frames by actually applying various loads to it or to the coupling and measuring the resulting deflections. This, however, is a slow and costly procedure, and I prefer instead to evaluate the stiffness of a trial flex frame or coupling by using a numerical stress analysis procedure capable of being carried out entirely or to a significant extent through the use of a computer. One skilled in structural theory can make such analyses using various existing methods, for example the well-known finite element method. However, for the present situation finite element analyses would be laborious, and the procedures presently preferred by me and believed to be the best to use are ones involving using simple approximate analyses based upon conventional beam theory and the parallelogram law for components of moment vectors and small angle changes.

In the case of applying my preferred analysis to a flex frame, the individual legs of the frame are considered to be beams subjected to both bending and torsion. Newmark's method, as explained in Newmark, N. M., *Numerical Procedure for Computing Deflections, Moments and Buckling Loads,* Transactions, American Society of Civil Engineers, Vol. 108, pp. 1161–1234, 1943, is used to perform the numerical integrations that find the forces, moments, rotations and deflections of the legs, because this method readily accommodates variable thickness legs and is easy to use.

The analysis to determine the stiffness of an individual flex frame proceeds as follows. First, consider the flex frame to be of an idealized shape such as shown in FIGS. 4 and 5 wherein the legs 22 and 24 are flat bottomed and of constant width B (although the width B of the short legs 22 may be different from the width B of the long legs 24) and are defined by these widths and by the other parameters shown in these figures. In practice the legs usually are inclined to the pad faces 17. The thickness of the inclined legs are made the same as those of the idealized flex frame with the exception of minor smoothing at positions near the abrupt change of direction at the pad edges. The contour length, Q, provides a smooth transition from the minimum or middle portion leg thickness T to the pad thickness S. Along the contour length I prefer to use an elliptical contour, such as that of the illustrated ellipse 30, with the ratio, K, of major to minor diameters of the ellipse being chosen during the iteration cycles of the analytical design.

Figure 6:
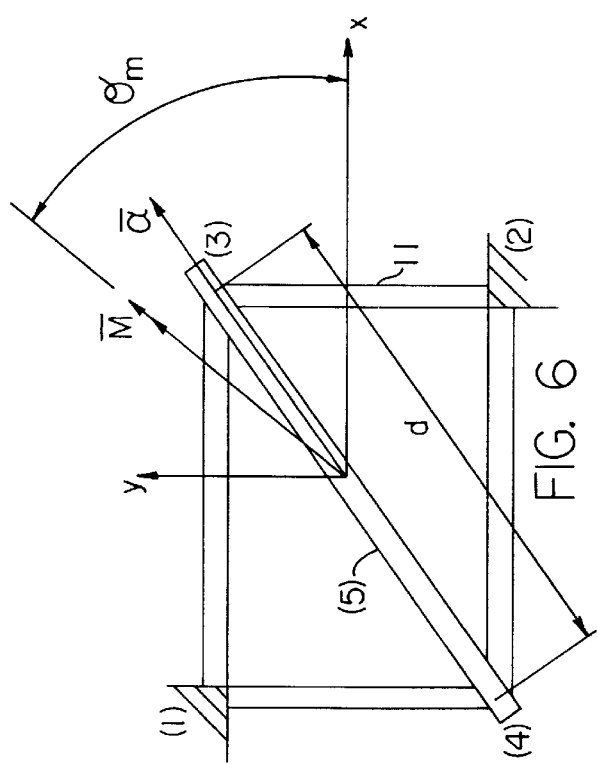

Next, consider the flex frame, as shown in FIG. 6, to be restrained at corners (1) and (2), with corners (3) and (4) connected by a rigid bar (5). The bar (5) is an idealization of the boundary provided by adjacent members in a coupling.

Now apply a unit angle change, $\bar{a}$, along the bar (5) as shown in FIG. 6. Consider each leg of the frame to be a beam subjected to the angle $\bar{a}$ at corners (3) and (4) while being cantilevered from its restrained corner (1) or (2) and while being simply supported perpendicular to the page at its corners (3) or (4). Note that the simple supports at the corners (3) and (4) are not necessary for equilibrium and thus constitute overconstraint. At each leg the angle change $\bar{a}$ is resolved into a component along the leg that produces torsional twisting and a component perpendicular to its length that produces bending. Now use Newmark's method to calculate the moment $\overline{M}$ and the unbalanced shears at corners (3) and (4). Note that the moment $\overline{M}$ comprises components from twisting and bending of the legs. The magnitude, M, of the vector $\overline{M}$ is the nominal stiffness of the flex frame. The angle to the moment vector is $\theta_m$ as shown in FIG. 6.

Figure 7:
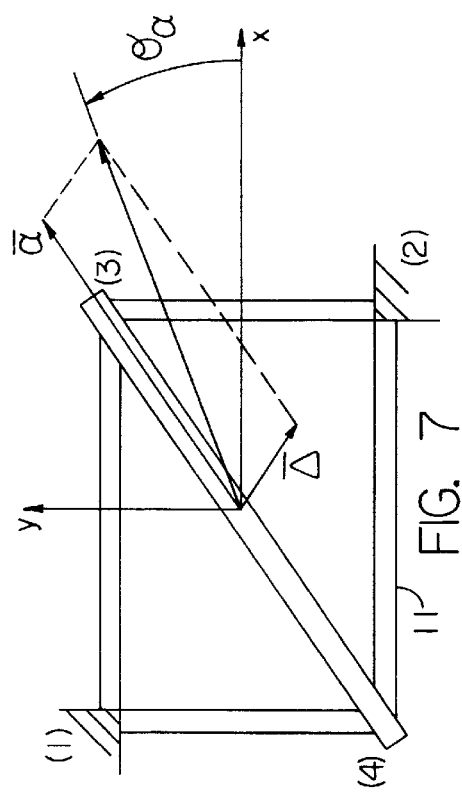
FIGS. 6 to 14 are schematic representations of the flex frame of FIGS. 4 and 5 showing various moments and relationships considered during various stages of the theoretical analysis of its structural properties.

Now, the unbalanced shears at the corners (3) and (4) are eliminated by relaxing the simply supported constraint and permitting the corners (3) and (4) to move. The movement produces an angle change $\overline{\Delta}$ that is added vectorally to the initial unit angle change $\bar{a}$. The magnitude of $\overline{\Delta}$=(unbalanced shear ×d)/M. The sense of $\overline{\Delta}$ corresponds to that of the moment produced by the unbalanced shears. The best direction for $\overline{\Delta}$ is along the diagonal line connecting corners (1) and (2). FIG. 7 shows the resultant angle change and the angle $\theta_a$ that it makes with the x-axis.

Because of its symmetry the flex frame 11 has a minimum stiffness and a maximum stiffness, which are principle stiffnesses, when the moment vector is parallel to the x-axis or the y-axis shown in FIGS. 6 and 7. For ordinary flex frame dimensions, the maximum stiffness occurs when the moment is parallel to the shorter legs 22, the y-axis. As shown in Appendix A the ratio of stiffnesses is:

$$\frac{M_y \text{ (along the y-axis)}}{M_x \text{ (along the x axis)}} = R_s = \frac{\tan \theta_m}{\tan \theta_a}$$

The stiffness $M_x$ is found from the relationship $$(M_x + R_s M_x)/2 = M$$

The stiffness $M_y = R_s M_x$.

In summary, the above analysis comprises the imposition of a unit angle change to an overconstrained flex frame, the release of the overconstraint, the calculation of an additional angle change caused by the release, and a determination of the principle flexural stiffnesses of the flex frame from the angles to the moment vector and to the angle change vector. Such calculations are performed without the need for simultaneous equations. In practice, it has been found that this simple, approximate analysis predicts stiffnesses in good agreement with actual measured stiffnesses, especially for flex frames wherein $R_s$ is less than 2.

In the case of evaluating the bending stiffness of a coupling, comprising a plurality of flex frames and end fittings connected in series with one another, it should be noted that the bending stiffness of the coupling varies sinusoidally with the direction of the applied bending moment. My preferred and best known way of finding the maximum and minimum flexural stiffness of the coupling is to select these extremes from a table of flexural stiffnesses calculated at positions over a range of 0 to 180 degrees. This analysis proceeds as follows. Apply a moment $\overline{M}$ to the coupling. Calculate the component of the resulting angle change that is collinear with $\overline{M}$. The flexural stiffness for that direction of moment=(M/component of angle change). Now select a new orientation of $\overline{M}$ and repeat the calculations. A method for performing the calculations is described in Appendix B. The effect of a gradient of moment over the length of the assembly is taken into account by assigning moments to each component that are in proportion to the condition under consideration.

APPENDIX A

Figure 8:
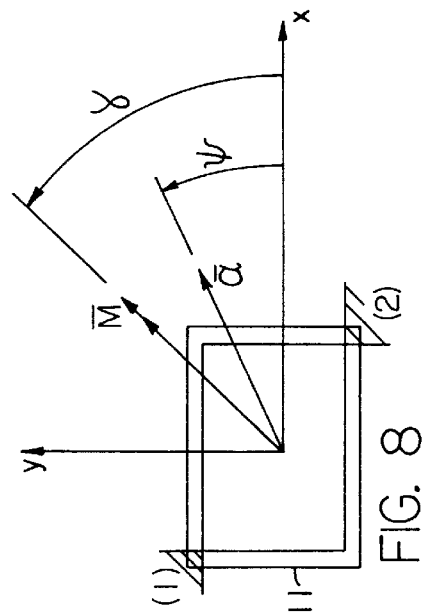

Flex Frame Stiffness as a Function of the Moment Vector and the Angle Change Vector Given:

A symmetrical flex frame 11 supported at corners (1) and (2) as shown in FIG. 8. The moment $\overline{M}$ produces the small angle change $\bar{a}$.

Figure 10:
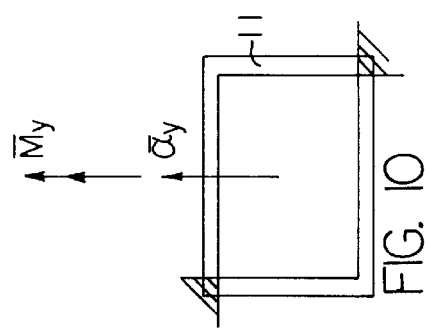
Figure 9:
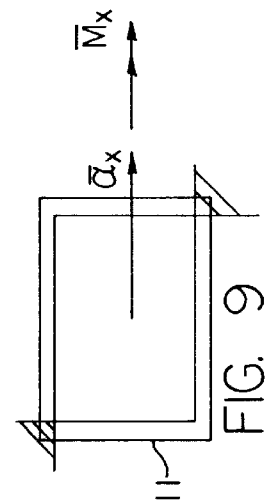

Required:
1) $M_x$ if the magnitude of $\bar{a}_x = a$ in FIG. 9.
2) $M_y$ if the magnitude of $\bar{a}_y = a$ in FIG. 10.
3) Frame stiffness ratio $R_s = M_y/M_x$.

Figure 12:
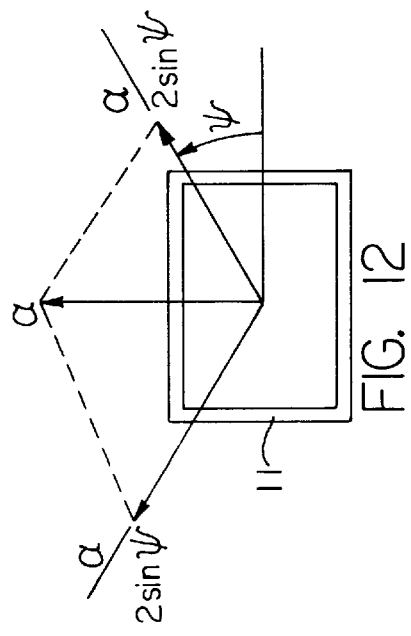
Figure 11:
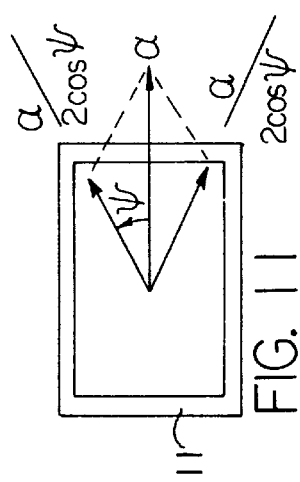

Solution:

Resolve $\bar{a}_x$ and $\bar{a}_y$ into components along directions $\pm\phi$. Then calculate the corresponding components of $\overline{M}$ along the x-axis and the y-axis, the components being identified in FIGS. 11 and 12.

$$M_x = 2 \times \frac{M}{2\cos\phi} \times \cos\gamma$$

$$M_x = M\frac{\cos\gamma}{\cos\phi}$$

$$M_y = 2 \times \frac{M}{2\sin\phi} \times \sin\gamma$$

$$M_y = M\frac{\sin\gamma}{\sin\phi}$$

Therefore, $\frac{M_y}{M_x} = Rs = \tan\gamma \tan\phi$

APPENDIX B

Flexural Stiffness of a Coupling

Figure 13:
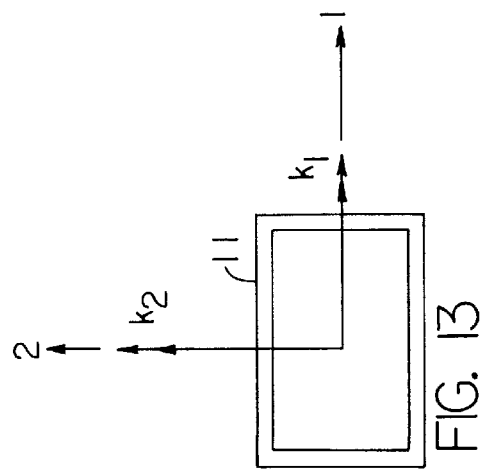

Given:

A coupling consists of end fittings and a number of flex frames connected to one another in series. Each component is characterized by its flexural stiffness $K_1$ and $K_2$ about the 1-axis and the 2-axis of the component as shown in FIG. 13 (wherein the component is taken to be a flex frame 11).

Figure 14:
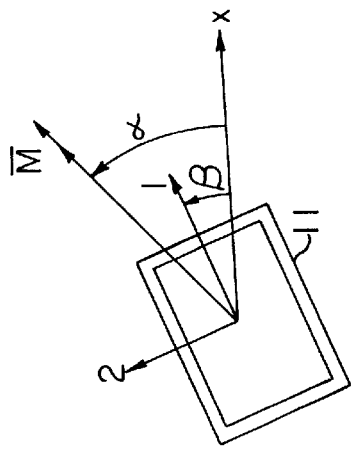

The x-axis shown in FIG. 14 is the reference axis for the coupling. The angle $\beta$ defines the orientation of the component relative to the reference axis. The angle $\alpha$ defines the orientation of a moment $\overline{M}$ applied to the component.

Required:

The stiffness of a coupling consisting of an assembly of components stacked and connected in series.

Solution:

Let C=the component of the angle change along the moment vector $\overline{M}$ from one component.

Resolve the moment into components along axes 1 and 2, and find the angle changes along axes 1 and 2.

Then find the components of these angle changes along the moment vector. Thus:

$$C = \frac{M}{K_1}\cos^2(\alpha - \beta) + \frac{M}{K_2}\sin^2(\alpha - \beta)$$

For an assembly of n components, $$C_T = \sum_{i=1}^{i=n} c_i$$

Let k=the flexural stiffness of the assembly.

$$k = M/C_T$$

I claim:

1. A flexible coupling for connecting driving and driven rotary members the rotational axes of which may be slightly misaligned relative to one another, said coupling comprising a first connecting means for connecting said coupling to said driving member, a second connecting means for connecting said coupling to said driven member, and at least one rectangular flex frame connected between said first connecting means and said second connecting means, said at least one flex frame having four legs consisting of two short legs generally identical and parallel to each other and two long legs longer than said short legs which long legs are generally identical and parallel to each other and generally perpendicular to said short legs, said legs of said at least one flex frame having cross sections of such dimensions that the stiffness of said coupling with respect to a bending moment applied between said first connecting means and said second connecting means in a plane containing said rotational axes of said driving and driven members is substantially uniform for all angles of said plane about said rotational axis of said driving member.

2. A flexible coupling as defined in claim 1 having such a stiffness characteristic with respect to bending moments applied between said first connecting means and said second connecting means that the ratio of maximum stiffness/minimum stiffness is equal to about 1.10 or less.

3. A flexible coupling as defined in claim 1 having such a stiffness characteristic with respect to bending moments applied between said first connecting means and said second connecting means that the ratio of maximum stiffness/minimum stiffness is equal to about 1.05 or less.

4. A flexible coupling as defined in claim 1 further characterized by said first and second connecting means being rigid so as to have an insignificant influence on the bending stiffness of the coupling, and by said at least one rectangular flex frame comprising only a single rectangular flex frame connected between said first connecting means and said second connecting means, said single flex frame having a substantially uniform stiffness with respect to the deflections imposed on said single flex frame during operation of said coupling with said rotational axes of said driving and driven members being slightly angularly misaligned.

5. A flexible coupling as defined in claim 4 further characterized by having a stiffness with respect to bending moments applied between said first connecting means and said second connecting means that the ratio of maximum stiffness/minimum stiffness is equal to about 1.10 or less.

6. A flexible coupling as defined in claim 4 further characterized by having a stiffness with respect to bending moments applied between said first connecting means and said second connecting means that the ratio of maximum stiffness/minimum stiffness is equal to about 1.05 or less.

7. A flexible coupling as defined in claim 1 further characterized by said first and second connecting means being essentially rigid so as to have an insignificant influence on the bending stiffness of the coupling, and by said at least one rectangular flex frame comprising a plurality of rectangular flex frames connected in series with one another and to and between said first connecting means and said second connecting means, with each one of said plurality of rectangular flex frames having a substantially uniform stiffness with respect to the deflections imposed on that one of said plurality of rectangular flex frames during operation of said coupling with said rotational axes of said driving and driven members being slightly angularly misaligned.

8. A flexible coupling as defined in claim 7 further characterized by having a stiffness with respect to bending moments applied between said first connecting means and said second connecting means that the ratio of maximum stiffness/minimum stiffness is equal to about 1.10 or less.

9. A flexible coupling as defined in claim 7 further characterized by having a stiffness with respect to bending moments applied between said first connecting means and said second connecting means that the ratio of maximum stiffness/minimum stiffness is equal to about 1.05 or less.

10. A flexible coupling as defined in claim 1 further characterized by said at least one rectangular flex frame comprising a plurality of rectangular flex frames connected in series with one another and to and between said first connecting means and said second connecting means, said plurality of rectangular flex frames including at least two different types of frames of different non-uniform stiffnesses, with the stiffnesses of said at lest two types of frames being so related to one another as to provide said coupling with a stiffness characteristic such that the stiffness ratio of maximum stiffness/minimum stiffness for said coupling is less than said stiffness ratio would be if all of said plurality of flex frames were of one or another of said at least two different types.

11. A flexible coupling as defined in claim 10 further characterized by having a stiffness characteristic with respect to bending moments applied between said first connecting means and said second connecting means that the ratio of maximum stiffness/minimum stiffness is equal to about 1.10 or less.

12. A flexible coupling as defined in claim 10 further characterized by having a stiffness characteristic with respect to bending moments applied between said first connecting means and said second connecting means that the ratio of maximum stiffness/minimum stiffness is equal to about 1.05 or less.

13. A flexible coupling as defined in claim 1 further characterized by said first and second connecting means each being an end fitting for connecting said coupling respectively to driving and driven shafts.

14. A flexible coupling as defined in claim 1 further characterized by said at least one rectangular flex frame comprising a plurality of rectangular flex frames connected in series with one another and to and between said first connecting means and said second connecting means, at least one of said first connecting means and said second connecting means having a non-uniform bending stiffness and being non-rigid as to have a substantial effect on the bending characteristics of said coupling, said plurality of rectangular flex frames including at least two different types of frames of which one type of flex frame is so dimensioned as to have a first bending stiffness characteristic and the other type of flex frame is so dimensioned as to have a a second bending stiffness characteristic, with said bending stiffness characteristic of said at least two types of frames being so related to one another and to the stiffnesses of said first connecting means and of said second connecting means that said coupling has a bending stiffness ratio of maximum stiffness/minimum stiffness which is less than it would be if all of said plurality of said flex frames were of one or another of said at least two different types.

15. A flexible coupling as defined in claim 1 further characterized by said first and second connecting means being rigid so as to have an insignificant influence on the bending stiffness of the coupling, and by said at least one rectangular flex frame comprising a plurality of rectangular flex frames connected in series with one another and to and between said first connecting means and said second connecting means, with each one of said plurality of flex frames having a substantially uniform stiffness with respect to the deflections imposed on on that one flex frame during operation of said coupling with said rotational axes of said driving and driven members being slightly angularly misaligned.

16. A flexible coupling as defined in claim 15 further characterized by having a stiffness with respect to bending moments applied between said first connecting means and said second connecting means that the ratio of maximum stiffness/minimum stiffness is equal to about 1.10 or less.

17. A flexible coupling as defined in claim 1 further characterized by said at least one rectangular flex frame comprising only a single rectangular flex frame connected between said first connecting means and said second connecting means, at least one of said first connecting means and said second connecting means having a non-uniform bending stiffness and being sufficiently non-rigid as to have a substantial effect on the bending characteristics of said coupling, said legs of said single flex frame being so dimensioned that said flex frame has a non-uniform stiffness so related to the stiffnesses of said first connecting means and of second connecting means that said coupling has a bending stiffness ratio of maximum stiffness/minimum stiffness of about 1.10 or less.

18. A flexible coupling as defined in claim 17 further characterized by it having a bending stiffness ratio of maximum stiffness/minimum stiffness of 1.05 or less.

19. A flexible coupling as defined in claim 1 further characterized by said at least one rectangular flex frame comprising a plurality of substantially identical rectangular flex frames connected in series with one another between said first connecting means and said second connecting means, at lest one of said first connecting means and said second connecting means having a non-uniform bending stiffness and being sufficiently non-rigid as to have a substantial effect on the bending characteristics of said coupling, each of said substantially identical rectangular flex frames making up said plurality of said flex frames being so dimensioned as to have a non-uniform stiffness so related to the stiffnesses of said first connecting means and of said second connecting means and of the other one or more of said flex frames that said coupling has a bending stiffness ratio of maximum stiffness/minimum stiffness of about 1.10 or less.

20. A flexible coupling as defined in claim 19 further characterized by it having a bending stiffness ratio of maximum stiffness/minimum stiffness of 1.05 or less.

* * * * *